United States Patent Office 3,068,218
Patented Dec. 11, 1962

3,068,218
SULFOCHLORINATION OF HYDROCARBONS
Helen Sellei Beretvas and Richard S. Juriga, Chicago, Ill., assignors to Standard Oil Company, Chicago, Ill., a corporation of Indiana
No Drawing. Filed Feb. 20, 1961, Ser. No. 90,190
7 Claims. (Cl. 260—139)

This invention relates to improvements in the sulfochlorination of unsaturated hydrocarbons. In a preferred embodiment, this invention relates to improvement in the sulfochlorination of highly branched chain unsaturated hydrocarbons.

Sulfur chloride has been employed as an agent for sulfochlorinating organic hydrocarbons. The use of sulfur chloride in sulfochlorination of olefin polymers is a well known expedient, e.g., see U.S. 2,152,828 wherein isobutylene polymers are sulfochlorinated with $S_2Cl_2$ to produce a chlorine and sulfur-containing material useful as an extreme pressure addition agent in lubricating oils as described therein. Often, purchasers of sulfochlorinated materials, particularly for use as EP agents, require that certain color standard be met. The color standards involve the lightness of the oil; i.e., the oil must be of a lightness sufficient to meet the standard. Lightness in EP oils is desirable for a variety of reasons. Where EP oils are used as cutting oils, it is often highly desirable that the workpiece be visible and use of light oils permits observation of the workpiece. Further, the color of the oil is sometimes considered to be an indication of deterioration of the oil and purchasers sometimes insist upon lighter oils for this reason.

Workers in the art have recently been striving to improve the colors of extreme pressure oils containing extreme pressure addition agents. Usually, sulfochlorinated hydrocarbons are darker in color than the oil and tend to discolor the oil. Further, the sulfochlorinated hydrocarbons tend to be unstable and darken in color under extended periods of storage; i.e., they are relatively color unstable. Thus, much work has been directed toward the improvement of color and color stability of sulfochlorinated hydrocarbons. It has been proposed to add water and/or a phosphorus sulfide during the sulfochlorination reaction to form a lighter product (see, Beretvas U.S. 2,727,030, patented Dec. 13, 1955). Although improvement has been obtained, it is desirable to further improve color and color stability of sulfochlorinated hydrocarbons especially where the hydrocarbon is a highly branched chain hydrocarbon. Such highly branched chain hydrocarbons have created greater color and color stability problems upon sulfochlorination than have the straighter chain hydrocarbons.

We have now found that color stable sulfochlorinated hydrocarbons having improved color can be obtained by including at least about 20 volume percent, based on hydrocarbon, of a mixture of water and a water-miscible oxygen-containing organic compound in the sulfochlorination reaction. In accordance herewith, an olefinic hydrocarbon is sulfochlorinated in the presence of the mixture of water and water-miscible organic compound. The sulfochlorination is carried out by reacting the hydrocarbon with sulfur chloride. The basic sulfochlorination reaction is well known; one atom of sulfur adds to each double bond until the desired amount of sulfurchlorination is effected; chlorine also adds to the olefinic hydrocarbon in lesser amounts. Thus, an amount of sulfur chloride may advantageously be used to provide one atom of sulfur for each double bond described to be reaction (e.g. from 1 to 150 weight percent). For example, for complete reaction when using sulfur monochloride ($S_2Cl_2$) one-half mole of sulfur chloride is reacted with each mole of olefinic hydrocarbon based on olefinic bonds, i.e. for each mole of monoolefin or each half mole of diolefin, etc. In the reaction mixture, of course, excesses of either reactant may be included; excesses of either reactant may be removed, if desired, after the reaction. Sulfochlorination under the conditions of this invention, i.e. in the presence of solvent amounts of the mixture of water and water-miscible oxygen-containing organic compounds, gives sulfochlorinated products of improved color.

In one embodiment of this invention, from one to 15 weight percent of phosphorus sulfide may also be included in the sulfochlorination reaction. Advantageously, the reaction may be carried out at a temperature from about 10 to about 100° C. The temperature is maintained below about 100° C. because the sulfochlorinated hydrocarbons tend to darken in color more quickly at elevated temperatures. If desired, the reaction may conveniently be carried out at the reflux temperature of the reaction mixture. The reflux temperature is the temperature at which total reflux of the mixture of water and water-miscible organic compound is obtained. The reflux temperature offers a convenient means for controlling the reaction temperature and, therefore, it is preferred that the water-miscible oxygen-containing organic compound boil in the range of 50° C. to 100° C. However, any sulfochlorination temperatures normally employed by those skilled in the art may be used herein. The reaction is usually complete within a period of from ten minutes to two hours although longer or shorter reaction times may be used if desired.

The mixture of water and water-miscible oxygen-containing organic compound is a solvent mixture and is used in solvent amounts of at least about 20% and preferably 35 to 65% by volume based on olefinic hydrocarbon. Amounts greater than about 70% may be used but are usually not necessary and increase the bulk of solvent mixture to be separated from the final product. The solvent mixture contains the water-miscible organic compound and water in a volume ratio of from about 1:4 to about 4:1; the volume ratio in the preferred embodiment is about 1:1.

The water-miscible oxygen-containing organic compounds are non-reacting solvents and include water-miscible alcohols such as methanol, ethanol and isopropanol as well as acetone and aqueous aldehydes. The water-miscible alcohol, and especially isopropanol, are preferred. However, although reference hereinafter is made to the preferred alcohols and particularly isopropanol, it is to be understood that any of the above described organic compounds are useable and are intended.

The invention will be further described with particular reference to the treatment of propylene tetramers prepared by polymerization of propylene with a phosphoric acid catalyst. It is to be understood, however, that other olefinic hydrocarbons and especially highly branched olefinic hydrocarbons are useable in the sulfochlorination reaction of the process of this invention. For example, propylene trimers, tetramers and higher polymers may be used. Also, polymers of other monomers such as the dimers, trimers and higher polymers of isobutylene, pentene, etc. Such polymers may be prepared by polymerization in the presence of an acid-type or a peroxide catalyst, by methods known to the art. Particularly suitable catalysts are phosphoric acid catalysts and heteropoly acid catalysts, e.g., phosphotungstic acid. For example, useable highly branched polymers may be prepared according to the process for polymerizing gaseous olefins described in Evering et al., U.S. 2,407,873, wherein an AlCl$_3$-hydrocarbon complex catalyst is employed. Polymers having some degree of unsaturation prepared with the same or different catalyst from the same or a different olefin may likewise be treated according to this invention, as may various highly branched monomeric olefins such as highly branched octenes, cetenes, dodecenes and the like, which are preferred to the straight chain olefins such as n-octene-1, n-decene-1, etc. Treatment in accordance with this invention is especially desirable when sulfochlorinating olefinic hydrocarbons having at least 8 carbon atoms and at least two branches in the hydrocarbon chain. In the preferred embodiment, at least one branch in the chain of the olefinic hydrocarbon is more complex structurally than a methyl branch. While those polymers having a molecular weight below about two thousand, preferably below about one thousand, have been found to yield excellent extreme pressure additives for lubricating oils when treated according to the present invention, it should be understood that the sulfurization technique herein described is applicable to a broad range of polymers having molecular weights as high as 300,000 or more. Such higher molecular weight materials may likewise be employed as additives to lubricating oils to impart valuable characteristics, e.g., oiliness, extreme pressure resistance, etc.

The sulfochlorination, if desired, may also be carried out in the presence of phosphorus sulfide, e.g., P$_2$S$_5$, P$_4$S$_3$, P$_2$S$_3$ as is described by H. S. Beretvas in U.S. 2,727,030 patented December 13, 1955; inclusion of phosphorus sulfide in the sulfochlorination reaction mixture may further increase product clarity. For example, from one to about 15 weight percent or more phosphorus sulfide and preferably 2 to 9 weight percent phosphorus sulfide based on olefinic hydrocarbon may be used. Although the use of greater amounts of phosphorus sulfide or water-alcohol mixture is not detrimental to the excellent color of the product, the removal of excess sulfur, alcohol and/or water is a problem which can readily be avoided by operating within the preferred ranges. In carrying out the sulfochlorination, we prefer first to mix the material to be sulfurized with the water-alcohol mixture and then add the sulfur chloride to the mixture. When phosphorus sulfide is employed, it is preferred to mix it initially with the material to be sulfochlorinated prior to the addition of sulfur chloride and water-alcohol mixture. A product prepared in the presence of a phosphorus sulfide may be heated to a temperature as high as about 300° F. without substantially affecting the color. When no phosphorus sulfide is present, the temperature to which the product may be heated, e.g. to remove the alcohol and water, is somewhat lower, i.e. no higher than about 250° F.

The sulfochlorination is carried out by adding the sulfur chloride to the mixture of unsaturated materials, alcohol and water. The sulfur chloride should be added slowly. The reaction is exothermic. Advantageously, adequate cooling may be provided to keep the reaction temperature within the range of 10 to 100° C. The preferred reaction temperature range is 20 to 50° C. for best product color. In the preferred method, the sulfur chloride addition can be completed in about fifteen minutes to 2 hours. The heat of reaction of sulfur chloride and hydrocarbon is not great but a rapid introduction of sulfur chloride should be avoided. Incremental addition permitting each increment of S$_2$Cl$_2$ to react with the olefinic hydrocarbon is most preferable. The sulfur chloride employed may be any of the usual sulfur chlorides, such as sulfur monochloride (S$_2$Cl$_2$), sulfur dichloride (SCl$_2$), or mixtures thereof, preferably sulfur monochloride.

To control the rate of the sulfochlorination reaction, it is often desirable to dilute the unsaturated hydrocarbon with a diluent such as a substantially saturated hydrocarbon solvent, for example, a petroleum naphtha, hexane or other relatively low-boiling hydrocarbon solvent, i.e. boiling below about 360–370° F.; this is particularly desirable with the heavier polymers. Where it is not essential that the diluent or solvent be removed from the sulfochlorinated product, higher boiling material such as a viscous hydrocarbon oil, can be used as the diluent.

The sulfochlorinated product obtained in the manner described contains some so-called corrosive sulfur and chlorine, and for uses wherein the presence of corrosive sulfur and chlorine is not detrimental or objectionable the product obtained in the sulfochlorination reaction can be used as such.

If the presence of corrosive sulfur and/or chlorine is objectionable or detrimental to the intended use of the sulfochlorinated product, the latter can be freed of the corrosive sulfur and/or chlorine by subjecting the same to a so-called deactivation step to obtain a non-corrosive product. Deactivation may be accomplished, for example, by treatment with an alkali metal sulfide to remove both corrosive sulfur and loosely bound (labile) corrosive chlorine or by treatment with an alcohol-water solvent to remove the labile chlorine only. Both of these deactivation methods involve heating the product in the presence of the deactivation agent.

When deactivating to remove sulfur and chlorine with the alkali metal sulfide as deactivation agent, the product may advantageously be refluxed with a solution containing about 5 percent to about 50 percent by weight of an alkali metal sulfide, such as sodium sulfide or a sodium polysulfide (Na$_2$S$_4$, Na$_2$S$_5$ mixtures thereof) or an alkali hydroxide such as sodium hydroxide; a low molecular weight aliphatic alcohol, such as isopropyl alcohol, ethyl alcohol, butyl alcohol, and the like, and water. Whereas the use of alcohol is desirable, it is not essential. The solution is refluxed for a period of from about one hour to about five hours, and preferably for about one to three hours. A suitable deactivating solution is one containing about 18 grams of anhydrous sodium sulfide, 34 cubic centimeters of isopropyl alcohol, and 100 cubic centimeters of water for each 100 grams of the sulfurized product. Deactivation of a previously neutralized sulfochlorinated product can be accomplished by refluxing the entire neutralized reaction mass with the alcoholic solution of the alkali metal sulfide or hydroxide without separating the neutralized hydrocarbon soluble fractions from the insoluble fractions. After refluxing for the desired period, approximately an equal volume of a low boiling hydrocarbon solvent, such as hexane or a low boiling naphtha such as a petroleum naphtha boiling below about 360° F., is added, if necessary, to the refluxed solution and the mixture allowed to settle for several hours to permit stratification into two distinct layers, the upper containing the deactivated sulfurized product. The deactivated product is washed free of alkali and recovered by low temperature vacuum stripping the hydrocarbon diluent or by other suitable means. The deactivation step also removes chlorine from the sulfurized product, the extent of dechlorination being dependent upon the amount of deactivator, i.e. Na$_2$S or NaOH.

Deactivation to remove chlorine may also be accomplished by heating the product in the presence of solvent amounts, e.g. 20 to 100 volume percent, of a mixture of water and water-miscible alcohol. Heating is preferably at the reflux temperature of the deactivation mixture for at least about ten minutes. The deactivation procedure may be repeated if desired for greater deactivation. After deactivation, the deactivated sulfochlorinated product can be withdrawn as a separate phase from the water-alcohol phase.

EXAMPLES

In order to illustrate the present invention, various sulfochlorination runs were made both in accordance with this invention and in accordance with known processes.

The runs made are set out in the table below. In each run, the defined olefinic hydrocarbon was sulfochlorinated with the reactants listed in the amounts stated (based on olefinic hydrocarbon). Sulfochlorination time in each run was about one hour. The sulfochlorinated product was then deactivated with alcohol and water as indicated in the table. Sulfochlorination and deactivation were both carried out at reflux temperatures because refluxing gave convenient temperature controls. Reflux temperatures where only water was present were about 95–100° C.; where only isopropyl alcohol was present refluxing was at 80–85° C.; where both alcohol and water were present refluxing was at 80–90° C. The runs were as follows:

The results of the aging test for color stability are reported in Table II below:

Table II

| Sample | True color before aging | True color after aging at 130° F. for a period of— | | |
|---|---|---|---|---|
| | | 1 Week | 2 Weeks | 3 Weeks |
| A | 93 | 368 | 736 | 928 |
| B | 1,200 | 2,400 | 2,900 | 2,900 |
| C | 33 | 92 | 184 | 240 |
| D | 97 | 300 | 368 | 464 |

Table I

| Run No | 1 | 2 | 3 | 4 | 5 | 6 | 7 | 8 | 9 | 10 | 11 |
|---|---|---|---|---|---|---|---|---|---|---|---|
| Olefinic hydrocarbon, grams | ¹1,000 | ¹1,000 | ¹1,000 | ¹1,000 | ¹1,000 | ²150 | ²150 | ³1,000 | ³1,000 | ⁴150 | ⁴150 |
| Sulfochlorination, amount of reactants per 100 grams of olefinic hydrocarbon: | | | | | | | | | | | |
| S₂Cl₂, gm | 42 | 42 | 42 | 42 | 42 | 55 | 55 | 70 | 70 | 62.7 | 62.7 |
| Isopropyl alcohol, cc | 35 | 25 | 0 | 0 | 25 | 25 | 0 | 25 | 0 | 25 | 0 |
| H₂O, cc | 25 | 0 | 10 | 10 | 35 | 35 | 35 | 35 | 10 | 35 | 10 |
| P₂S₃, gm | 0 | 0 | 0 | 1 | 1 | 1 | 1 | 5 | 5 | 1 | 1 |
| First deactivation, added ingredients, amounts per 100 grams hydrocarbon: | | | | | | | | | | | |
| Isopropyl alcohol, cc | ⁵None | ⁵None | 25 | 25 | ⁵None | ⁵None | 25 | ⁵None | 25 | 25 | 25 |
| H₂O, cc | ⁵None | ⁵None | 25 | 25 | ⁵None | ⁵None | 25 | ⁵None | 25 | 25 | 25 |
| First deactivation reflux time, minutes | 30 | 30 | 30 | 60 | 60 | 60 | 60 | 90 | 90 | 60 | 60 |
| Second deactivation, added ingredients, amounts per 100 grams, hydrocarbon: | | | | | | | | | | | |
| Isopropyl alcohol, cc | 5 | (⁶) | 5 | 5 | 5 | 5 | 5 | (⁶) | (⁶) | 5 | 5 |
| H₂O, cc | 20 | (⁶) | 20 | 20 | 20 | 20 | 20 | (⁶) | (⁶) | 20 | 20 |
| Second deactivation reflux time, minutes | 15 | (⁶) | 15 | 30 | 30 | 30 | 30 | (⁶) | (⁶) | 30 | 30 |
| Product: | | | | | | | | | | | |
| Analysis: | | | | | | | | | | | |
| Percent S | 12.7 | 14.9 | 10.6 | 15.3 | 13.3 | 23.2 | 23.0 | 33.7 | 29.0 | 30.2 | 32.9 |
| Percent Cl | 4.2 | 5.7 | 4.6 | 3.3 | 3.6 | 8.1 | 9.0 | 9.06 | 10.3 | 11.2 | 12.5 |
| Percent P | 0 | 0 | 0 | 0.11 | | 0.03 | 0.13 | | | | |
| True color | 75 | 1,920 | 600 | 1,472 | 92 | 25 | 97 | (⁷) | (⁷) | 8 | 10 |
| True color calculated for 10% S ⁸ | 59 | 1,290 | 567 | 962 | 69 | 10.8 | 42 | | | 2.7 | 3 |
| Color intensity | 1 | 22 | 10 | 16 | 1 | 1 | 4 | | | 1 | 1.2 |

¹ Propylene tetramer.
² Propylene trimer.
³ C₇ codimer.
³ n-Octene-1.
⁵ Refluxed in the presence of the alcohol and water remaining from the sulfochlorination reaction.
⁶ No second deactivation.
⁷ Run 8 had an NPA color of 2½–3 and run 9 had an NPA color of 4½.
⁸ For application as extreme pressure agents, the sulfochlorinated products are often used in amounts inversely proportional to sulfur content. Thus, true color comparisons have been calculated for a given sulfur content, i.e., 10%.

In the above table, the amounts of alcohol and water reported under the deactivations were amounts of alcohol and water added prior to the deactivation step in addition to amounts remaining from the preceding sulfochlorination or deactivation step.

Runs 1, 5, 6, 8 and 10 were carried out in accordance with this invention. It is readily seen that a product of lighter color is obtained from the present process by comparision with corresponding runs carried out not in accordance herewith. In the case of the highly branched olefinic hydrocarbon, e.g. propylene tetramer, the resulting product differed substantially from the products of the comparative processes as is evidenced by true color and color intensity.

The products formed in accordance herewith when using alcohol and water during sulfochlorination do not lose their color advantages through color instability. Reaction products prepared in accordance with the present invention using a propylene trimer and a highly branched propylene tetramer as the unsaturated hydrocarbons were submitted to a temperature of 130° F. for a period of 3 weeks and the true color changes of the products were noted and reported each week. For comparison, sulfochlorinated propylene trimer and tetramer were prepared without using the water-alcohol mixture. The samples tested were as follows:

Sample A—a sulfochlorinated product prepared in accordance with the procedure of Run 1 above.
Sample B—a sulfochlorinated product prepared in accordance with the procedure of Run 2 above.
Sample C—a sulfochlorinated product prepared in accordance with the procedure of Run 6 above.
Sample D—a sulfochlorinated product prepared in accordance with the procedure of Run 7 above.

The data reported in Table II above demonstrate that even after three weeks storage under accelerated aging conditions, the products of this invention are of substantially lighter color than products prepared without the alcohol-water mixture during sulfochlorination.

The true color values reported herein are obtained by determining the dilution necessary to get an ASTM color between 4 and 5 by using a colorless diluent, e.g. naphtha, and calculating the true color according to the following table.

True Colors From ASTM Colors

| Dilution ¹ ratio | ASTM color | | | | |
|---|---|---|---|---|---|
| | 5 | 4¾ | 4½ | 4¼ | 4 |
| 1:1 ² | 75 | 60 | 46 | 33 | 29 |
| 1:2 | 150 | 120 | 92 | 66 | 58 |
| 1:4 | 300 | 240 | 184 | 132 | 116 |
| 1:8 | 600 | 480 | 368 | 264 | 232 |
| 1:16 | 1,200 | 960 | 736 | 528 | 464 |
| 1:32 | 2,400 | 1,920 | 1,472 | 1,056 | 928 |
| 1:64 | 4,800 | 3,840 | 2,944 | 2,112 | 1,856 |

¹ Sample: sample plus diluent.
² No dilution. True color equivalent of ASTM color.

The above table (other than the values for true color equivalents at no dilution) was calculated from the formula:

True color of unknown = True color equivalent of ASTM color between 4 and 5 times the dilution of unknown required to obtain that ASTM color between 4 and 5.

Thus, if a dilution ratio of 1:16 is required to obtain an ASTM color of 5 the true color would be 1200, i.e. 16×75=1200. The true color equivalents of ASTM colors between 4 and 5 were obtained from the chart on page 165 of "Industrial and Engineering Chemistry," February 1926.

The $C_7$ codimer used in the above runs was a $C_7$ olefin prepared by the polymerization of propylene with butylenes. The propylene tetramer and trimer were prepared by polymerizing propylene using a phosphoric acid catalyst. The trimer contained 90+% $C_9$ olefin and had an initial boiling point of about 122° C. and a 90% point of 145° C+. The tetramer contained about 20% $C_{11}$'s and about 72% $C_{12}$'s; the remainder predominated in $C_{10}$, $C_{13}$ and $C_{14}$ hydrocarbons. The tetramer had at least two branches per molecule and one of these branches was more complex than a methyl group, apparently containing at least two carbon atoms. Typical inspection data for the tetramer are:

ASTM distillation:
- IBP _____ ° C__ 180
- 10% _____ ° C__ 182
- 50% _____ ° C__ 185
- 70% _____ ° C__ 188
- 90% _____ ° C__ 190
- Max. _____ ° C__ 193

Sp. gravity _____ .773
$n_D$ _____ 1.440
Bromine number _____ 118

Composition index, $C_nH_{2n-x}$:
- x=0 _____ 93.7
- 2 _____ 5.5
- 4 _____ 0.5

The sulfochlorinated hydrocarbons provided herein are suitable as addition agents for lubricating oils. They are useful as extreme pressure agents for the purpose of imparting extreme pressure properties thereto and also for preparation of extreme pressure addition agents, e.g. neutralized and/or deactivated sulfochlorinated hydrocarbons. The extreme pressure agents are useful, for example, in cutting oils, metal working lubricants, gear oils, etc. for improving extreme pressure properties. The lubricating oils include the hydrocarbon lubricating oils, both mineral and synthetic, but are not limited thereto. Examples of other useful lubricating oils are those lubricating oils of the alkylene oxide type and the mono- and polycarboxylic acid ester type, such as the oil-soluble esters of adipic acid, sebacic acid, azelaic acid, etc. It is also contemplated that various other well known additives, such as antioxidants, anti-foaming agents, pourpoint depressors, rust inhibitors, detergency agents, etc., may be incorporated into lubricating oils containing extreme pressure agents prepared in accordance herewith. Concentrates of the extreme pressure agents provided herein, e.g. from 10 to 50% or more in a lubricating oil, or suitable solvent, may be prepared for later dilution with or addition to lubricating oils.

Unless otherwise stated, the percentages given herein and in the claims are percentages by weight.

It is evident from the foregoing that we have provided an improved sulfochlorination process and product.

We claim:

1. The method which comprises reacting sulfur chloride with an olefinic hydrocarbon in the presence of at least about 20 volume percent of a mixture of water and water-miscible oxygen-containing organic compound boiling in the range of about 50 to 100° C., said mixture having a volume ratio of water to said water-miscible compound in the range of from about 1:4 to 4:1.

2. The method of claim 1 wherein said olefinic hydrocarbon is a highly branched hydrocarbon having at least two branches in the hydrocarbon chain.

3. The method of claim 2 wherein said hydrocarbon is a $C_{8+}$ hydrocarbon and at least one of said branches corresponds to a hydrocarbon structure more complex than a methyl group.

4. The method of claim 1 wherein from 1 to 15 weight percent of phosphorus sulfide is included in the reactants based on weight of olefinic hydrocarbon.

5. The method of claim 1 which includes the additional step of heating the resulting reaction product in the presence of said mixture at a temperature between about 50° C. and the reflux temperature of the reaction product and said mixture whereby labile chlorine in said product is deactivated.

6. The method which comprises sulfochlorinating a propylene tetramer in the presence of from about 35 to about 65 volume percent of a mixture of water and isopropyl alcohol at a temperature in the range of 10° C. to 100° C. for a period of 10 minutes to 2 hours using sulfur monochloride as the sulfochlorinating reactant, said mixture having a volume ratio of water-isopropyl alcohol of about 1:1, refluxing the resulting sulfochlorinated propylene tetramer in the presence of from about 20 to about 100 volume percent of a mixture of water and water-miscible alcohol for a period of at least ten minutes, and recovering the refluxed sulfochlorinated propylene tetramer as a product.

7. The product prepared by the method of claim 3.

References Cited in the file of this patent

UNITED STATES PATENTS

| 2,497,138 | Rogers | Feb. 14, 1950 |
| 2,708,199 | Eby | May 10, 1955 |
| 2,727,030 | Beretvas | Dec. 13, 1955 |